United States Patent
Belmonte de Udaondo et al.

(10) Patent No.: US 12,398,694 B2
(45) Date of Patent: Aug. 26, 2025

(54) METHOD FOR STARTING UP A WIND TURBINE

(71) Applicant: Siemens Gamesa Renewable Energy Innovation & Technology, S.L., Sarriguren (ES)

(72) Inventors: Esteban Belmonte de Udaondo, Pamplona (ES); Javier Garcés Quilez, Navarra (ES); Dennis Stachniuk Jensen, Brande (DK); Stephane Munch, Madrid (ES); Aitor Saenz Aguirre, Guipuzkoa (ES)

(73) Assignee: SIEMENS GAMESA RENEWABLE ENERGY INNOVATION & TECHNOLOGY, S.L., Sarriguren (ES)

( * ) Notice: Subject to any disclaimer, the term of this patent is extended or adjusted under 35 U.S.C. 154(b) by 0 days.

(21) Appl. No.: 18/718,541

(22) PCT Filed: Nov. 29, 2022

(86) PCT No.: PCT/EP2022/083602
§ 371 (c)(1),
(2) Date: Jun. 11, 2024

(87) PCT Pub. No.: WO2023/110385
PCT Pub. Date: Jun. 22, 2023

(65) Prior Publication Data
US 2025/0043768 A1    Feb. 6, 2025

(30) Foreign Application Priority Data
Dec. 17, 2021  (EP) ..................................... 21383153

(51) Int. Cl.
F03D 7/02    (2006.01)
F03D 80/40    (2016.01)

(52) U.S. Cl.
CPC ........... *F03D 7/026* (2013.01); *F03D 7/0224* (2013.01); *F03D 80/40* (2016.05)

(58) Field of Classification Search
CPC ......... F03D 7/026; F03D 80/40; F03D 7/0224
See application file for complete search history.

(56) References Cited

U.S. PATENT DOCUMENTS

2008/0317583 A1    12/2008    Grabau
2013/0106107 A1*    5/2013    Spruce .................. F03D 7/0224
                                                                290/44

(Continued)

FOREIGN PATENT DOCUMENTS

CA    2508316 C    8/2012
CN    101124402 B    5/2010

(Continued)

OTHER PUBLICATIONS

PCT International Search Report and Written Opinion of International Searching Authority mailed Feb. 21, 2023 corresponding to PCT International Application No. PCT/EP2022/083602 filed Nov. 29, 2022.

*Primary Examiner* — Viet P Nguyen
(74) *Attorney, Agent, or Firm* — Schmeiser, Olsen & Watts LLP

(57) ABSTRACT

A method for starting up a wind turbine for generating electrical power is provided, wherein ice accretion is on at least one blade of a rotor of the wind turbine and wherein the at least one blade has a variable pitch angle, the method including measuring the rotational speed of the electromechanical transducer, calculating a pitch angle adjustment with the goal of maximizing the rotational speed, modifying the pitch angle in a positive or negative step according to the pitch angle adjustment, iterate the preceding steps.

11 Claims, 3 Drawing Sheets

(56) References Cited

U.S. PATENT DOCUMENTS

| | | |
|---|---|---|
| 2014/0091572 A1 | 4/2014 | Jepsen |
| 2017/0058871 A1 | 3/2017 | Movsichoff et al. |
| 2017/0226990 A1 | 8/2017 | Arlaban Gabeiras et al. |

FOREIGN PATENT DOCUMENTS

| | | |
|---|---|---|
| CN | 103821665 A | 5/2014 |
| DE | 20014238 U1 | 6/2001 |
| EP | 2559894 A1 | 2/2013 |
| RU | 2567616 C2 | 11/2015 |
| WO | 9801340 A1 | 1/1998 |
| WO | 2004057182 A1 | 7/2004 |

\* cited by examiner

METHOD FOR STARTING UP A WIND TURBINE

CROSS-REFERENCE TO RELATED APPLICATIONS

This application is a national stage of PCT Application No. PCT/EP2022/083602, having a filing date of Nov. 29, 2022, which claims priority to EP Application Serial No. 21383153.0, having a filing date of Dec. 17, 2021, the entire contents both of which are hereby incorporated by reference.

FIELD OF TECHNOLOGY

The following relates to the technical field of starting up a wind turbine with ice accretion on a rotor blade. In particular, the following relates to a method for starting up a wind turbine. Further, the following relates to a wind turbine control system and to a wind turbine which are all adapted for executing the method for starting up a wind turbine.

BACKGROUND

Ice accretion or ice formation on the rotor blades remarkably reduces the aerodynamic performance of wind turbines. The shapes of the aerodynamic profiles are modified due to the ice accreted on them and, as a result, their aerodynamic behavior is severely altered. Furthermore, the wind turbine's operation can be threatened due to the aerodynamic stall phenomena.

By now, the main objective of the operation with ice control functionality is to avoid stop of the wind turbine during icing conditions and maximize its power production. To that end, adaptive pitch and torque functionalities can be implemented in order to try to avoid the wind turbine from suffering aerodynamic stall during icing periods.

There are several methods for the operation with ice or the ice removal from the wind turbine blades.

CA 2508316 C discloses a generator which is used as a motor to remove ice from the blades.

CN 103821665 A, DE 20014238 U1, WO 1998001340 A1 disclose removal of ice using a de-icing system.

CN 101124402 B discloses ice prevention in offshore wind turbines using sea water.

RU 2567616 C2 discloses operation in ice situations based on stopping the wind turbine.

US20170058871 A1 discloses operation in ice situations based on yawing the wind turbines.

Normally, control strategies designed for the operation with ice are focused on maximizing the power production of the turbines during icing conditions. However, these strategies might result useless if the wind turbine is unable to complete the start-up procedure due to the ice accretion.

Therefore, there may be a need for improving the start-up procedure of wind turbines in cold climates.

SUMMARY

An aspect relates to a method for starting up a wind turbine for generating electrical power, wherein ice accretion is on at least one blade of a rotor of the wind turbine and wherein the at least one blade has a variable pitch angle, the method comprising measuring the rotational speed of the electromechanical transducer, calculating a pitch angle adjustment with the goal of maximizing the rotational speed, modifying the pitch angle in a positive or negative step according to the pitch angle adjustment, iterate the preceding steps.

The described method is based on the idea to provide an adaptive pitch strategy for a wind turbine start-up procedure in cold climates. The described method serves to improve the start-up capability of wind turbines affected by ice accretion on the blades.

The pitch angle is modified in positive or negative steps according to the temporal development of the rotational speed and with the objective of maximizing it.

The proposed adaptive pitch strategy improves the start-up process of the wind turbines during icing periods. As the ice accretes on the blades, the aerodynamic profile is changed and the optimal pitch angle changes to an unknown value. Even due to this worsened and unknown aerodynamic behavior of the blades, the proposed method enables the wind turbine to accelerate and reach the rotational speed necessary to connect the wind turbine to the grid.

The optimization algorithm utilizes the rotational speed as an input. This allows operation even when the wind turbine is not connected to the grid. In that case there is no electrical power to measure.

The described method may have the advantage of an Annual Energy Production (AEP) gain in cold climate sites. In embodiments, the method might enable the wind turbine to start-up and connect to the grid even with ice accretion on the blades. Without this functionality, the wind turbine might suffer important energy production losses.

Further, the described method does not require to install or calibrate any sensor or de-icing system, which is usually not included in a wind turbine. In embodiments, the method is robust, cost competitive and easy to implement.

According to an embodiment of the invention, the pitch angle adjustment is calculated with a cost function, the cost function receiving the rotational speed of the electromechanical transducer as an input with the goal of maximizing the rotational speed. Having ice accretion on the blades, the pitch angle behavior is dynamic and not static anymore. Such situation can be covered well by a cost function. The cost function aims at maximizing the rotational speed by comparing it before and after each adjustment to the pitch angle. A cost function may be designed by a numerical optimization procedure for example. Simulations can be performed to reach values for implementing a cost function. Such cost function may be a scalar cost function.

According to an embodiment of the invention as a first step, ice accretion is detected. Such detection may be achieved by identifying non-plausible or not expected sensor readings, the wind turbine not producing enough energy, the startup procedure not working in normal parameters and/or by weather information.

According to an embodiment of the invention as a last step, the method is terminated after sufficient rotational speed is measured to connect the electromechanical transducer to the grid, a predetermined time limit is reached without being able to start-up the wind turbine and/or no ice is detected.

According to an embodiment of the invention, the measured rotational speed of the electromechanical transducer is filtered with a low pass and/or a band pass. Filters can be implemented as first order or second order. Filtering may enhance robustness of the method.

According to an embodiment of the invention, a first pitch angle adjustment is a pitch step towards feather. Feathering means that the blade pitch is increased to the point that the chord line of the blade is approximately parallel to the on-coming airflow. This approach minimizes the unwanted effect of stalling the wind turbine.

According to an embodiment of the invention, if the pitch angle adjustment towards feather does not lead to an increase of the speed of the electromechanical transducer a pitch angle adjustment towards fine is introduced. The next or second iteration step could be directed to the opposite direction i.e., towards fine. Such approach may deliver better information of the ice situation and could lead to the optimized pitch angle.

According to an embodiment of the invention, amplitudes of the pitch angle adjustments are adaptive with respect to the number of iterations. As the optimal pitch angle for the current ice accretion situation should be closer with an increasing number of iterations the amplitude of the adjustments may be lowered. Further, the pitch movement, according to each adaptation or iteration, may have a maximum and a minimum. This may prevent that the algorithm runs too far in a wrong direction. Adaptation of the amplitude of pitch angle adjustments may help to better adapt to the unknown ice conditions.

According to embodiments of the invention, there is provided a wind turbine control system for controlling a wind turbine having an electromechanical transducer. The control system comprises a computation unit adapted for executing the method as described above, an input adapted for receiving a rotational speed of the electromechanical transducer, and an output adapted for outputting a pitch angle adjustment. The same advantages and modifications as described above apply.

According to an embodiment of the invention, the computation unit comprises a low pass and/or a band pass filter adapted for filtering the measured rotational speed of the electromechanical transducer. The filter can be implemented as first order or second order. Implementing a filtering stage allows for more reliable and sturdy data handling.

According to a further aspect of embodiments of the invention, there is provided a wind turbine for generating electrical power. The provided wind turbine comprises a tower, a rotor, which is arranged at a top portion of the tower, and which comprises at least one blade, wherein the at least one blade has a variable pitch angle, an electromechanical transducer which is mechanically coupled with the rotor, and a wind turbine control system as described above. The same advantages and modifications as described above apply.

According to an embodiment of the invention, the wind turbine comprises a rotational speed sensor adapted for measuring the rotational speed of the electromechanical transducer and/or a pitch sensor adapted for measuring a pitch angle of the at least one blade. According to the described wind turbine, it is not required to install or calibrate any further sensors or a de-icing system, which is usually not included in a wind turbine. Thus, the improvement is being robust, cost competitive and easy to implement.

It has to be noted that embodiments of the invention have been described with reference to different subject matters. Some embodiments have been described with reference to apparatus type claims whereas other embodiments have been described with reference to method type claims. However, a person skilled in the conventional will gather from the above and the following description that, unless other notified, in addition to any combination of features belonging to one type of subject matter also any combination between features relating to different subject matters, in particular between features of the apparatus type claims and features of the method type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein.

DETAILED DESCRIPTION

Figure 1:
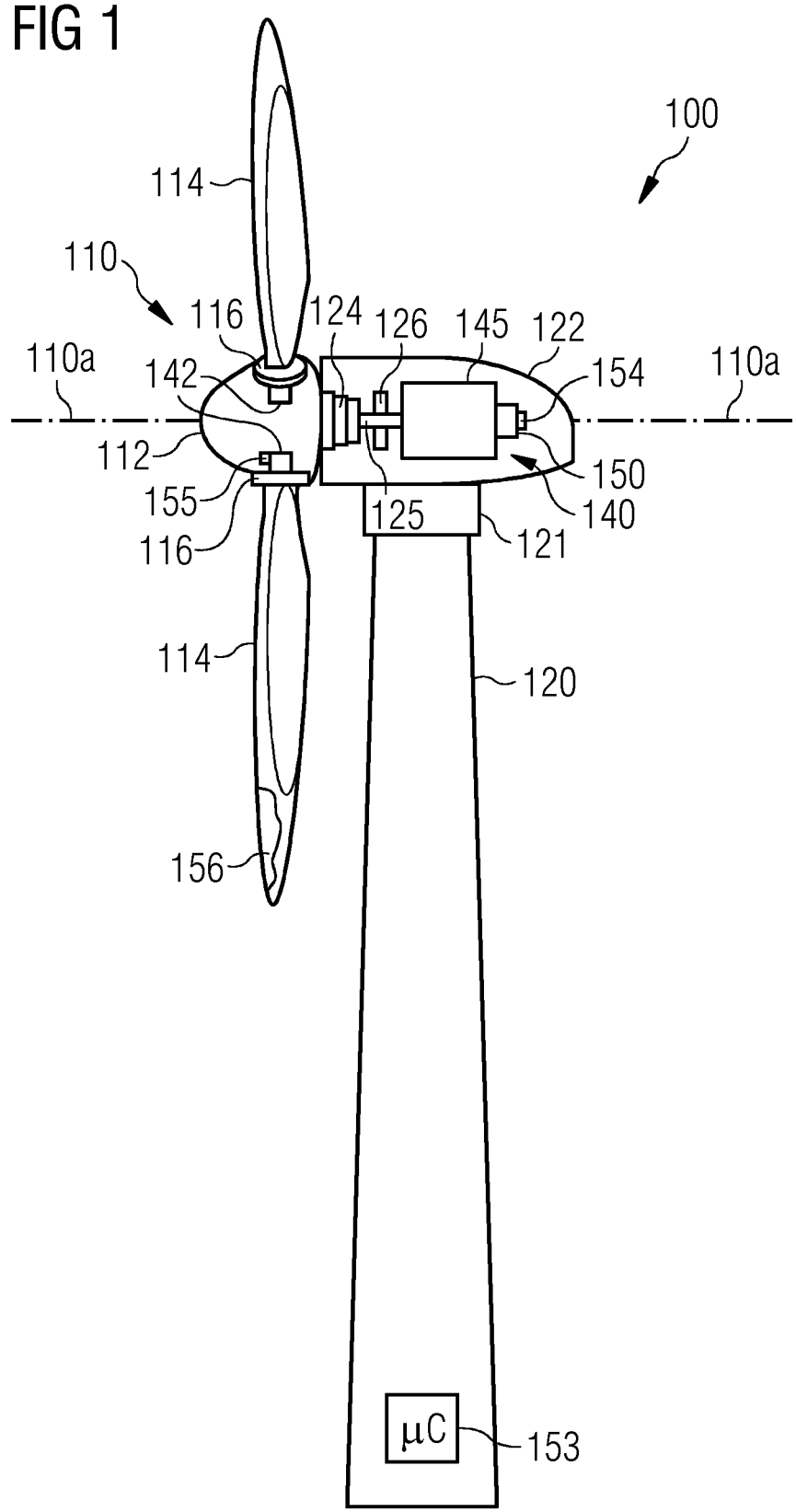
FIG. 1 shows a wind turbine according to an embodiment of the present invention.

FIG. 1 shows a wind turbine 100 according to an embodiment of the invention. The wind turbine 100 comprises a tower 120, which is mounted on a non-depicted fundament. On top of the tower 120 there is arranged a nacelle 122. In between the tower 120 and the nacelle 122 there is provided a yaw angle adjustment device 121, which is capable of rotating the nacelle 122 around a non-depicted vertical axis, which is aligned with the longitudinal extension of the tower 120. By controlling the yaw angle adjustment device 121 in an appropriate manner it can be made sure that during a normal operation of the wind turbine 100 the nacelle 122 is always properly aligned with the current wind direction. However, the yaw angle adjustment device 121 can also be used to adjust the yaw angle to a position, wherein the nacelle 122 is intentionally not perfectly aligned with the current wind direction.

The wind turbine 100 further comprises a rotor 110 having three blades 114. In the perspective of FIG. 1 only two blades 114 are visible. The rotor 110 is rotatable around a rotational axis 110a. The blades 114, which are mounted at a hub 112, extend radially with respect to the rotational axis 110a.

In between the hub 112 and a blade 114 there is respectively provided a blade adjustment device 116 in order to adjust the blade pitch angle of each blade 114 by rotating the respective blade 114 around a non-depicted axis being aligned substantially parallel with the longitudinal extension of the blade 114. By controlling the blade adjustment device 116 the blade pitch angle of the respective blade 114 can be adjusted in such a manner that at least when the wind is not so strong a maximum wind power can be retrieved from the available wind power. However, the blade pitch angle can also be intentionally adjusted to a position, wherein only a reduced wind power can be captured.

As can be seen from FIG. 1, the rotor 110 is directly coupled with a shaft 125, which is coupled in a known manner to an electromechanical transducer 140. The electromechanical transducer is a generator 140.

Accordingly, the turbine is a direct drive type, wherein the hub is directly connected to the generator 140, i.e., no gearbox is present. Alternatively, a gearbox may be arranged between the shaft 125 and the generator 140.

Further, a brake 126 is provided in order to stop the operation of the wind turbine 100 or to reduce the rotational speed of the rotor 110 for instance (a) in case of an emergency, (b) in case of too strong wind conditions, which might harm the wind turbine 100, and/or (c) in case of an intentional saving of the consumed fatigue life time and/or the fatigue life time consumption rate of at least one structural component of the wind turbine 100.

In accordance with basic principles of electrical engineering the generator 140 comprises a stator assembly 145 and a rotor assembly 150. The generator 140 may include an external rotor 150 which is arranged outside the stator 145.

The stator assembly 145 comprises a plurality of coils for generating electrical current in response to a time alternating magnetic flux. The rotor assembly comprises a plurality of permanent magnets, which are arranged in rows being aligned with a longitudinal axis of the rotor assembly 150. The permanent magnets may be skewed to reduce torque ripple.

The wind turbine 100 further comprises a control system 153 for operating the wind turbine 100 in a highly efficient manner. Apart from controlling for instance the yaw angle adjustment device 121 the depicted control system 153 is also used for adjusting the blade pitch angle of the rotor blades 114 in an optimized manner.

The control system 153 is connected with a rotational speed sensor 154 which is adapted for measuring the rotational speed of the generator 140. The control system 153 is further connected with a pitch sensor 155 which is adapted for measuring a pitch angle of the rotor blades 114. For ease of understanding power lines and signal lines between the control system 153 and the sensors are not depicted. Details of the control system 153 are discussed in conjunction with the following figures.

In cold climates, ice accretion 156 aggregates on the rotor blades 114 which severely reduces the aerodynamic performance of the wind turbine 100. The shapes of the aerodynamic profiles of the rotor blades 114 are modified due to the ice accreted on them so that their aerodynamic behavior is altered.

Cold climates can be defined as continental climate and polar climate. Regions in a continental climate tend to have warm to cool summers and very cold winters. In the winter, this climate zone can experience snowstorms, strong winds, and very cold temperatures—sometimes falling below −30° C. For regions in a polar climate zone, the temperatures tend to never increase higher than 10° C. even during summer.

Figure 2:
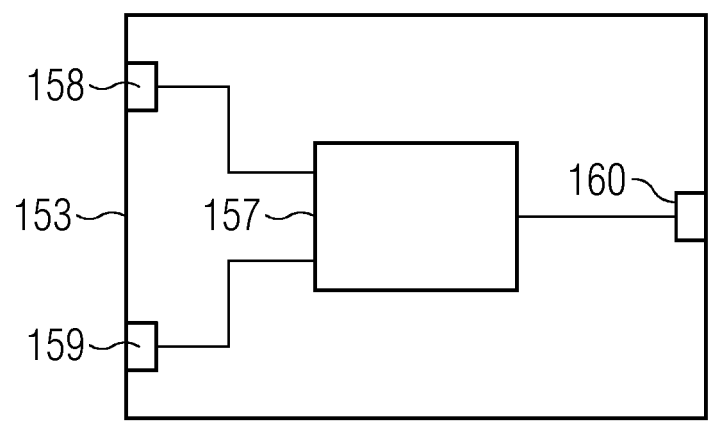
FIG. 2 shows a schematic illustration of a control system of the wind turbine.

FIG. 2 shows a schematic view of the control system 153 which is adapted to execute or calculate an adaptive pitch strategy for a start-up procedure of the wind turbine 100 in cold climates.

The control system 153 includes a computation unit 157 like a microprocessor or the like. The control system 153 or the computation unit 157, respectively is adapted for executing a method for starting up a wind turbine 100 when ice accretion is on a blade 114 of the rotor 110 of the wind turbine 100. In embodiments, the method is described in conjunction with the following figures.

The control system 153 is connected with the rotational speed sensor 154 via a first input 158. The first input 158 is connected with the computation unit 157. A value or signal provided by the rotational speed sensor 154 is treated as an input by the control system 153 and is utilized for calculations such as the method or algorithm for starting up a wind turbine 100 with ice accretion.

The control system 153 is further connected with a pitch sensor 155 via a second input 159. The second input 159 is connected with the computation unit 157. A single pitch sensor 155 can be implemented or one pitch sensor 155 can be provided for each of the rotor blades 114. The number of second inputs 159 may equal to the number of pitch sensors 155.

A value or signal provided by the pitch sensor 155 is treated as an input by the control system 153 and is utilized for calculations such as the method or algorithm for starting up a wind turbine 100 with ice accretion.

The control system 153 has at least one output 160 for outputting control or steering values or signals which can among others be used for adjusting the blade pitch angle of the rotor blades 114. The control signals are derived from calculations based on the input signal or signals.

Figure 3:
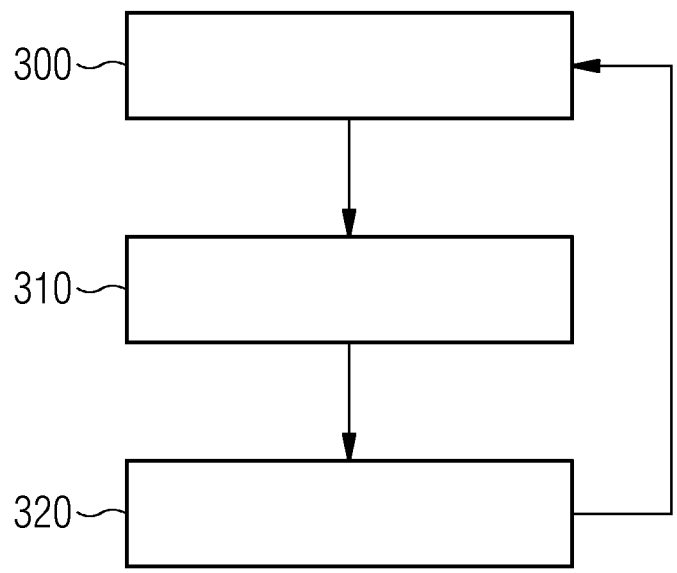
FIG. 3 shows a flow diagram of a method for starting up a wind turbine having ice accretion on its blade.

FIG. 3 shows a flow diagram of a method for starting up a wind turbine 100 having ice accretion on its blade 114 and/or being located in a cold climate. In embodiments, the method can be executed by or implemented in the control system 153 as described before.

In a first step 300, the rotational speed of the electromechanical transducer here in form of the generator 140 is measured. The measured rotational speed may be filtered for example with a low or band pass before further processing it.

In some embodiments, as a primary step or as a starting condition, ice accretion is detected. Alternatively, the adaptive pitch strategy of the described method can be set as default for a wind turbine 100 start-up procedure in cold climates.

In a second step 310, a pitch angle adjustment is calculated with the goal of maximizing the rotational speed of the wind turbine 100. The rotational speed of the wind turbine 100 corresponds to the measured rotational speed of the generator 140. With the goal of maximizing the rotational speed of the wind turbine 100 a quick start of the wind turbine 100 can be achieved as the generator needs a certain rotational speed for connecting it to the grid.

The calculation of the pitch angle adjustment may be achieved by a cost function. Such cost function receives the rotational speed of the generator 140 as an input with the goal of maximizing the rotational speed by maximizing the cost. The cost function is explained in conjunction with FIG. 4.

In a third step 320, the pitch angle is modified in a positive or negative step or amount according to the calculated pitch angle adjustment.

The preceding steps are iterated in a loop so that effect of the calculated pitch angle adjustment can be evaluated in the calculation step. Depending on the change in rotational speed the pitch angle adjustment of the next iteration will have the same or opposite sign. The same sign may be applied when the rotational speed had increased while the opposite may be applied when the rotational speed had decreased.

As an optional last step or as a termination condition, the method is terminated after sufficient rotational speed is measured to connect the generator 140 to the grid, a predetermined time limit is reached without being able to start-up the wind turbine 100 and/or no ice is detected, e.g., when implausible sensor readings have stopped.

Figure 4:
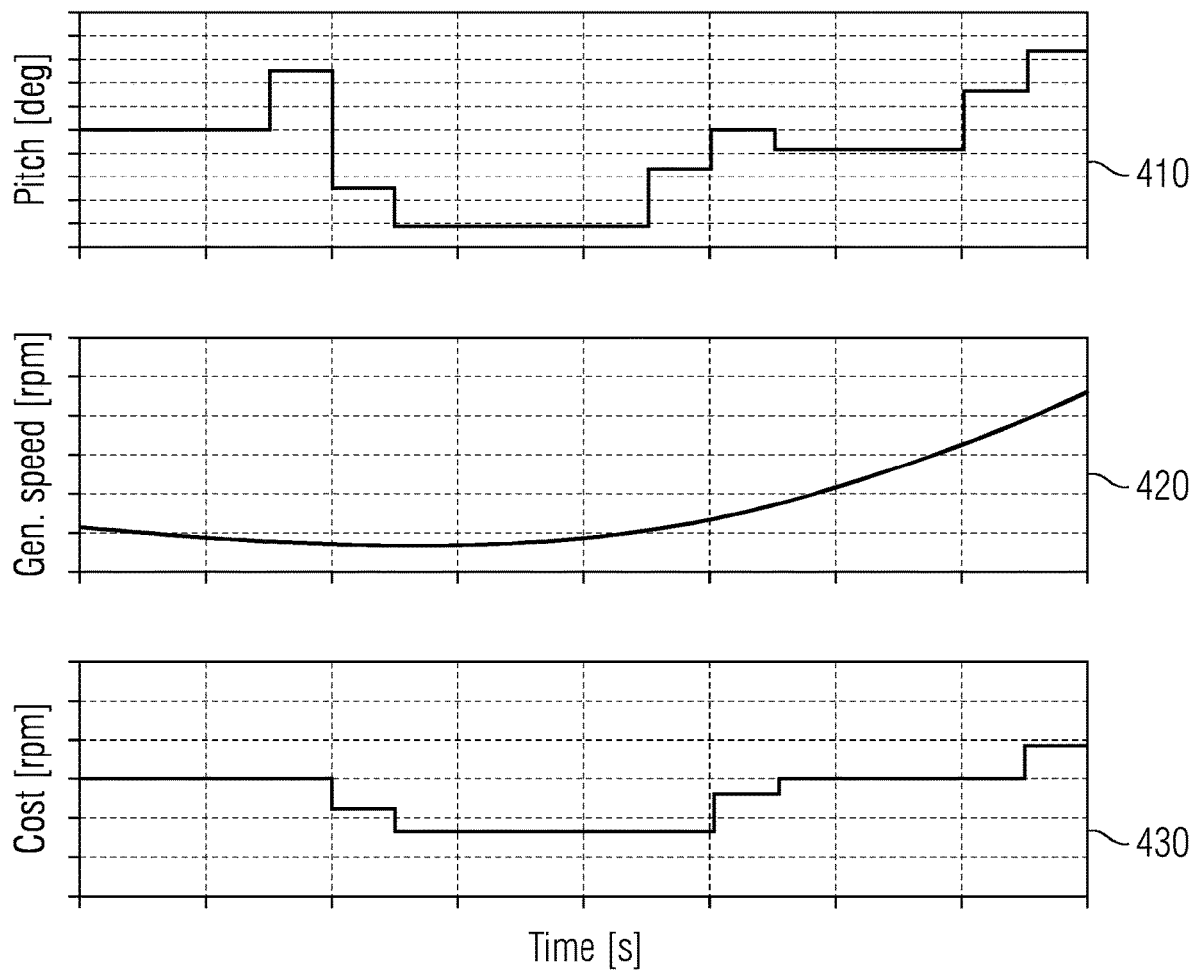
FIG. 4 shows diagrams of the pitch, the generator speed and the cost according to an implementation of the method depicted in FIG. 3.

FIG. 4 shows a diagram 410 of the pitch, a diagram 420 of the generator speed and a diagram 430 of the cost according to an implementation of the method depicted in FIG. 3. All diagrams are shown over time in seconds.

The described optimization algorithm or method cyclically looks for the optimal pitch angle according to the evolution of the rotational speed. This evolution of the pitch angle is shown in diagram 420 in revolutions per minute (rpm).

Diagram 410 shows the pitch angle in degrees. Changes in the pitch angle originate from the calculated pitch angle adjustments.

Diagram 430 shows the cost in rpm which corresponds to the incremental difference between the rotational speed before and after the pitch angle change, this change due to a calculated and applied pitch angle adjustment.

In this example, the cost function starts with a pitch angle adjustment towards feather. This calculated pitch angle adjustment is applied as a pitch step towards feather. Feathering means that the blade pitch angle is increased to the point that the chord line of the blade is approximately parallel to the on-coming airflow. This approach minimizes the unwanted effect of stalling the wind turbine.

In diagram 410, this first pitch angle adjustment is depicted as the first increase of the pitch angle. As a consequence, the rotational speed decreases as is shown in diagram 420. This decrease in speed is unwanted. Hence, the cost decreases as well as is depicted in diagram 430.

As described, the first pitch angle adjustment towards feather does not lead to an increase of the speed of the generator 140 and thus decreases cost. As the cost function aims to maximize cost a pitch angle adjustment towards fine i.e., to the opposite is introduced.

As the rotational speed as well as the cost decreases further a further step towards fine having a smaller amplitude is introduced. As a consequence, the rotational speed increases slowly over time.

Hence, the cost function has found a way to maximize the generator speed and issues some increasing pitch angle adjustments with the result of increasing rotational speed and cost.

The amplitudes of the pitch angle adjustment and pitch steps may be adaptive with respect to the number of search iterations, as the optimal pitch angle should be closer with the increasing number of iterations.

As a termination condition of the iteration, the method may be terminated after sufficient rotational speed is measured to connect the generator 140 to the grid, a predetermined time limit is reached without being able to start-up the wind turbine 100 and/or no ice is detected anymore.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for starting up a wind turbine for generating electrical power, wherein ice accretion is on at least one blade of a rotor of the wind turbine and wherein the at least one blade has a variable pitch angle, the method comprising:
   measuring a rotational speed of an electromechanical transducer;
   calculating a pitch angle adjustment with a goal of maximizing a rotational speed of the wind turbine;
   modifying the variable pitch angle in a positive or negative step according to the pitch angle adjustment; and
   iterate the preceding steps, whereby the method cyclically looks for an optimal pitch angle according to an evolution of the rotational speed, wherein
   the pitch angle adjustment is calculated with a cost function, the cost function receiving the rotational speed of the electromechanical transducer as an input with the goal of maximizing the rotational speed.

2. The method as set forth in claim 1, wherein
as a first step, ice accretion is detected.

3. The method as set forth in claim 1, wherein
as a last step, the method is terminated after sufficient rotational speed is measured to connect the electromechanical transducer to a grid, a predetermined time limit is reached without being able to start-up the wind turbine and/or no ice is detected.

4. The method as set forth in claim 1, wherein
the measured rotational speed of the electromechanical transducer is filtered with a low pass and/or a band pass.

5. The method as set forth in claim 1, wherein
a first pitch angle adjustment is a pitch step towards feather.

6. The method as set forth in claim 5, wherein if the pitch angle adjustment towards feather does not lead to an increase of the speed of the electromechanical transducer a pitch angle adjustment towards fine is introduced.

7. The method as set forth in claim 1, wherein
amplitudes of the pitch angle adjustments are adaptive with respect to a number of iterations.

8. A wind turbine control system for controlling a wind turbine having an electromechanical transducer, the control system comprising:
   a computation unit configured for executing the method as set forth in claim 1;
   an input configured for receiving a rotational speed of an electromechanical transducer; and
   an output configured for outputting a pitch angle adjustment.

9. The wind turbine control system as set forth in claim 8, wherein
the computation unit comprises a low pass and/or a band pass filter configured for filtering the measured rotational speed of the electromechanical transducer.

10. A wind turbine for generating electrical power, the wind turbine comprising:
    a tower;
    a rotor, which is arranged at a top portion of the tower and which comprises at least one blade, wherein the at least one blade has a variable pitch angle;
    an electromechanical transducer which is mechanically coupled with the rotor; and
    a wind turbine control system as set forth in claim 8.

11. The wind turbine as set forth in claim 10, wherein
the wind turbine comprises a rotational speed sensor configured for measuring the rotational speed of the electromechanical transducer and/or a pitch sensor configured for measuring a pitch angle of the at least one blade.

* * * * *